No. 852,418. PATENTED MAY 7, 1907.
W. A. CHURCH.
TENTERING MACHINE.
APPLICATION FILED MAR. 3, 1906.

2 SHEETS—SHEET 1.

WITNESSES.
A. G. Pieczentkowski.
Daniel Townend

INVENTOR.
William A. Church
By Horatio E. Bellows
ATTORNEY.

No. 852,418. PATENTED MAY 7, 1907.
W. A. CHURCH.
TENTERING MACHINE.
APPLICATION FILED MAR. 3, 1906.
2 SHEETS—SHEET 2.
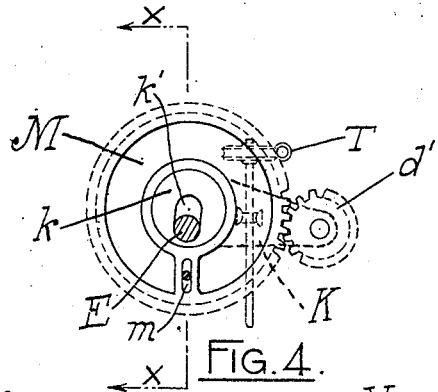
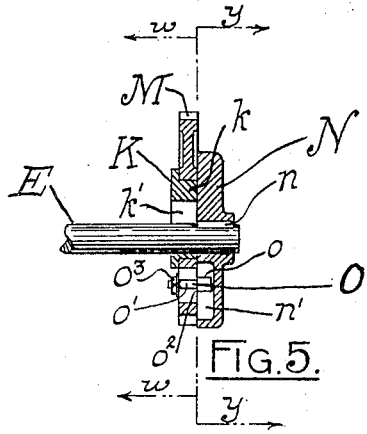
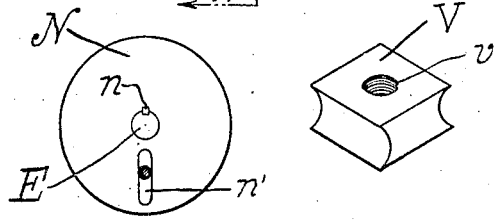
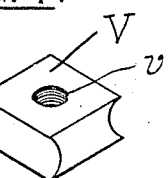
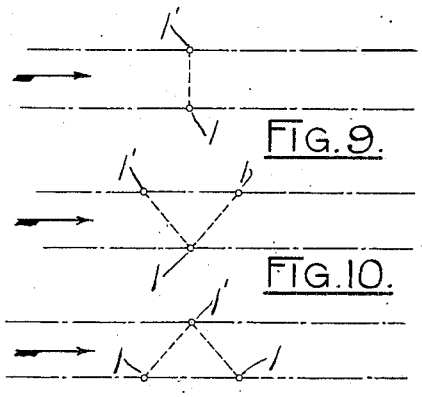
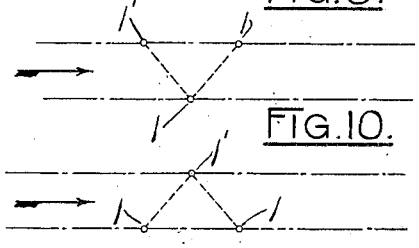
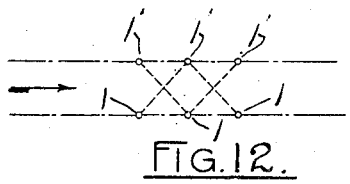
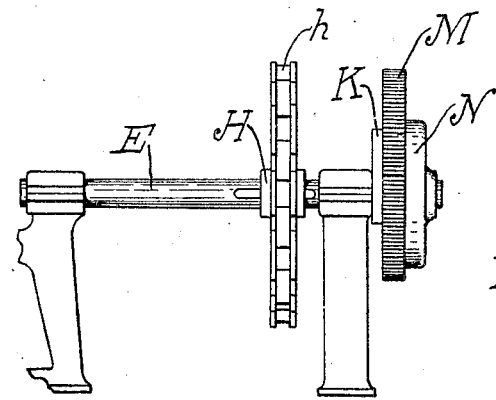
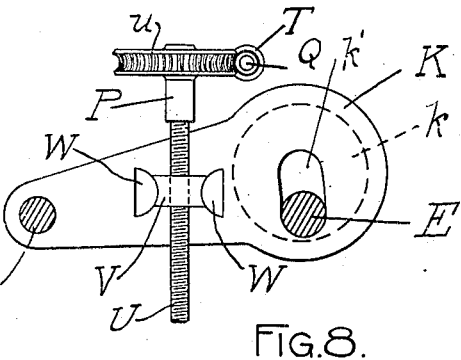
WITNESSES.
A.G. Pieczentkowski.
Daniel Townend
INVENTOR.
William A. Church
By Horatio E. Bellows
ATTORNEY.

UNITED STATES PATENT OFFICE.

WILLIAM A. CHURCH, OF PROVIDENCE, RHODE ISLAND.

TENTERING-MACHINE.

No. 852,418.  Specification of Letters Patent.  Patented May 7, 1907.

Application filed March 3, 1906. Serial No. 303,997.

*To all whom it may concern:*

Be it known that I, WILLIAM A. CHURCH, a citizen of the United States, residing at Providence, in the county of Providence and State of Rhode Island, have invented certain new and useful Improvements in Tentering-Machines, of which the following is a specification, reference being had therein to the accompanying drawing.

My invention refers to tentering machines and has for its objects, besides the ends commonly sought in such machines, a structure possessing a minimum of parts and extreme lightness, and which avoids reciprocating or moving the side rails, their actuating mechanism, and other heavy machine parts connected therewith, which occasion excessive vibration and strains upon the fabric, machine, and flooring.

A further object is to provide in a single machine means for varying the degree and direction of the tension swing or jig. Heretofore tentering machines have been restricted by the character of their operating mechanism to three or less lengths of vibration, oscillation, or swing, commonly called "shifts;" all adjustments, therefore, had to be limited to three or less predetermined positions, without possibility of modification to any point intermediate such predetermined positions.

Another, and very important object, is to provide in a single machine means for imparting any and every conceivable direction of stretch, either straight or diagonal, to fabrics operated upon, thereby obviating the present necessity of different machines for different textures of fabric.

A further object is to embody means for changing the tension upon the fabric which is capable of adjustment while the machine is in operation.

The enumerated and other objects which will be hereinafter referred to and claimed are attained by this invention which consists essentially in a novel adjusting and driving mechanism.

Figure 1:
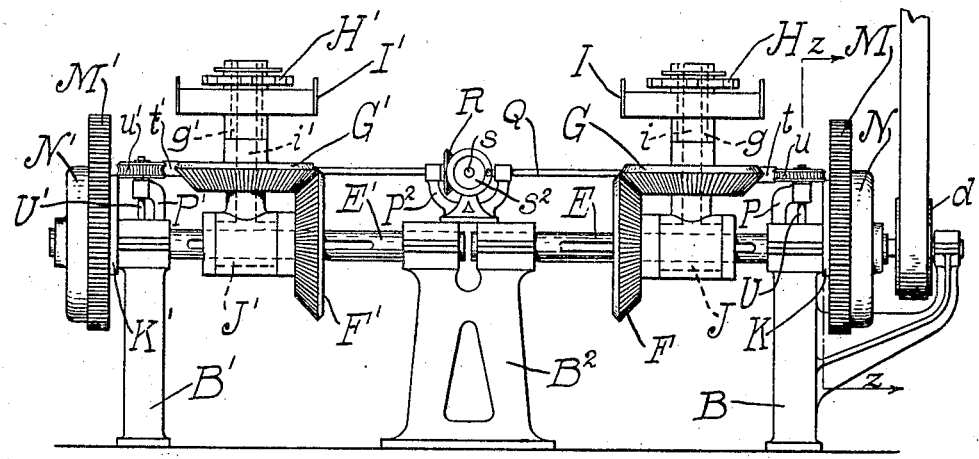
Figure 2:
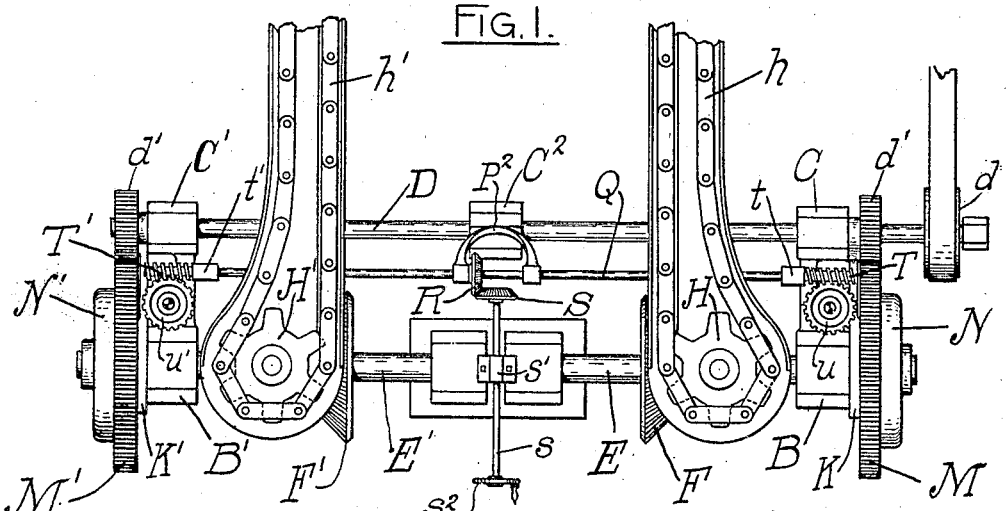
Figure 3:
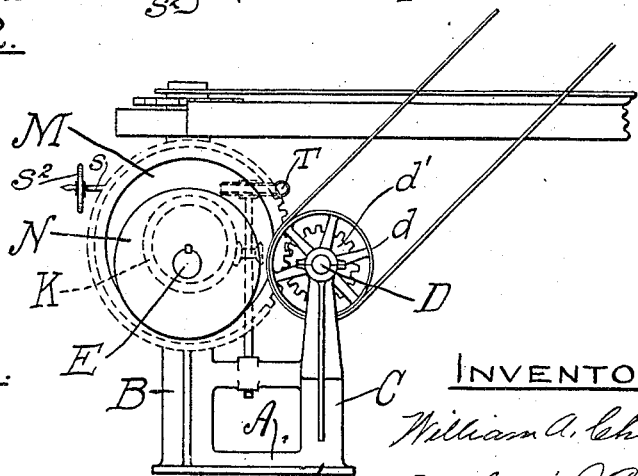

In the drawings which constitute a part of this specification, and in which like reference characters indicate like parts, Figure 1 is an elevation of one end of a tentering machine embodying my invention. Figs. 2 and 3, plan and side elevations respectively of the same. Fig. 4, a section of the driving mechanism on line $w\,w$ of Fig. 5. Fig. 5, a transverse section of the same on $x\,x$ of Fig. 4. Fig. 6, a section on line $y\,y$ of Fig. 5. Fig. 7, a perspective of the adjusting block. Fig. 8, a section of the machine on line $z\,z$ of Fig. 1. Figs. 9, 10, 11 and 12, diagrammatic views of the relative advance of given points upon the carrier chain couplets, produced by four selected adjustments of the driving mechanism, and Fig. 13, an elevation of a portion of one end of a machine showing a modified form of applying the invention.

The framework of my machine may be of any form of construction suitable for carrying the several details of mechanisms. In the form thereof herein shown it consists essentially of a frame, A, comprising end supports, B C, B', C', and intermediate end supports, $B^2$, $C^2$, the support $B^2$ being preferably bifurcated. The power shaft, D, transversely mounted in the supports, C, C' and $C^2$ is driven by a pulley, $d$, and carries pinions, $d'$. The driving shaft is divided, forming two sections, E E' whose adjacent ends are journaled in the support, $B^2$, and whose outer extremities are sustained by the supports, B and B'. The power transmission connections for the carrier chains may be of any desired type. One form comprises vertical bevel gears, F and F', keyed to the shafts, E and E', and meshing respectively with horizontal gears, G and G', secured to vertical shafts, $g\,g'$, terminating in driving or sprocket wheels, H H' for the conveyer-chains, $h$, $h'$. The side rails, I, I', which are longitudinally stationary, are journaled upon upright pins, $i\,i'$, which in turn are journaled on transverse axes at J, J', concentric with the driving shafts, E, E'. A less complicated and equally efficient power transmission for the chain, as shown in Fig. 13, consists in mounting each sprocket wheel, H, directly to the driving shaft, E.

Referring to the adjustable driving mechanism, the same comprises two sets of devices identical with each other in every detail, of construction and operation. One set mounted on the ends of the shafts, D, E, and the other set, oppositely located upon the shafts, D, E'. The description of one set will, therefore, suffice for both, appropriate prime marks being employed to designate such corresponding parts of the second set as are shown. A nearly horizontal sector shaped arm, K, is loosely journaled at its end upon the power shaft, D, and is provided intermediate its extremities with a circular lateral projection or lug, $k$, which forms a bearing. This arm has also a vertically disposed arc shaped opening, $k'$, of sufficient width to allow the passage therethrough of the driving shaft, E. Loosely mounted on the bearing, $k$, and concentric therewith is a spur gear, M, whose teeth mesh with the teeth of pinion, $d'$, by which it is rotated. The spur gear, M, is provided with a radial slot, $m$. Disk N is fixed by a key, $n$, to end of the shaft, E, with its inner face contacting with the face of bearing, $k$, and gear, M. It is provided with a radial slot, $n'$, upon its inner face of slightly greater width than the width of slot $m$, with which it coincides. The disk N is connected with the gear M by a pin, O, in the slots, $m$ and $n'$, which pin is preferably adjustable. In detail the pin comprises an enlarged or head portion, $o$, and a reduced shank portion, $o'$, whereby is formed an intermediate shoulder, $o^2$. The reduced portion, $o'$, has its end threaded to receive a clamping nut, $o^3$. By means of this nut and the shoulder, $o^2$ the pin is firmly fixed in the gear, M, and locks the latter to the driving disk, N.

It is desirable that an adjustment be provided for the driving mechanism, which may consist of any device capable of elevating or depressing one or both the sector arms. An approved means for this purpose comprises bracket arms, P, P' and P² respectively mounted upon the tops of the supports, C, C' and C². In bracket P² is mounted a shaft, Q, fixed to which is a miter gear, R, meshing with another miter gear, S, fixed on the end of a rod, $s$, journaled in a bracket, $s'$, upon the support, B². The rod, $s$, is provided with a hand wheel, $s^2$. Loosely mounted upon the extremities of the shaft, Q, are worms, T and T', provided with marginal teeth, adapted to engage respectively the teeth of clutches, $t$ and $t'$, which are slidably keyed to the shaft. Rotatably mounted in the sides of the frame and the arms, P and P' respectively are vertically stationary threaded shafts, U, U' carrying worm wheels, $u$ $u'$ upon their upper end meshing with the worms, T T'.

As shown in Fig. 8, there is mounted to travel vertically upon the threaded shaft, U, a rectangular adjusting block, V, whose threads, $v$, loosely engage the threads of the shaft. The block has concave opposite sides which frictionally engage the curved faces of two horizontally disposed segmental lugs, W, W, upon the inner face of the segment arm, K. A similar block, mounted in like manner upon the shaft, U', engages similar lugs on the segment arm, K'. It is evident that the rotation of the shafts, U or U' in either direction will either elevate or depress the connected arms, K or K', in accordance with the direction of the rotation.

The operation of my machine is as follows: The power shaft, D, is driven by the pulley, $d$, from any convenient source of power, and through the pinions, $d'$, rotates the gears, M, M', which through the pins, O, drive the disks or wheels, N, N' and shafts, E, E'. When the form of power transmission used is that shown in Fig. 13, the rotation of the shaft, E, directly actuates the sprocket wheel, H, and its chain, $h$. A like transmission means is employed on the other side of the machine. When the type of transmission is that of Fig. 1, the shafts E and E' through gears F, F' and G, G' rotate the shafts $g$, $g'$, and their connected sprocket or chain wheels, H, H' whereby is imparted to the chains, $h$ and $h'$, the linear speed and movement produced by the shafts E and E'. The above two types of transmission means are not intended as exclusive. Referring to the described driving mechanism, it will be observed that when the driving shaft, E, is so positioned in the opening, $k'$, of the arm, K, as to be concentric with the periphery of the gear, M, the rotation of said shaft will be constant and the linear movement of the chain, $h$, will be regular, constant, and continuous. If, however, the arm, K, be elevated or depressed in relation to the described position of the shaft, E, the gear, N, will impart to the shaft a circumferential speed which will vary at different points in its rotation. This will be communicated to the chain, $h$, and be there converted into an irregular linear movement; that is, the chain will, during its travel, advance with regularly alternating increased and diminished speed. The magnitude of these alternations will depend upon the distance off center of gear, M, in relation to the shaft, E, to which it imparts motion. Since there are two practically independent driving mechanisms in the machine, the possibility of variation in the relative advances of the chains and the resulting variations in the intensity and direction of the stretch upon the fabric are infinite. Some typical jigs or stretches available upon my machine are diagrammatically shown by Figs. 9, 10, 11 and 12, wherein the horizontal lines represent the two chains moving in the direction of the arrows; $l$, a given point on the chain driven through the spur gear, M; and $l'$ an opposite point on the chain driven by the spur gear, M'. In Fig. 9, the advance of the points, $l$ and $l'$, are synchronous since the centers of each spur gear and its main shaft are coincident. In Fig. 10, the indicated position of the points are induced by the gear, M, being on, and the gear, M', off center. In Fig. 11, the gear, M, is off, and the gear, M', on center. Both gears are off their respective centers in Fig. 12. In the last figure the chains have a positive movement in the same direction with variable speed as they advance.

The adjustability of the pin, O, is not essential to the operativeness of my machine, but affords, among other things, an auxiliary means of modifying the chain travel, it being evident that placing the pin toward or away from the shaft, E, increases or decreases respectively the circumferential speed of said shaft and the travel of connected chains. In actual practice this pin is positioned when the machine is set up, and occasions for subsequent adjustment are comparatively infrequent.

The operation of the device for independently or unitedly elevating the sector arms of the two sets of driving mechanism is to connect the clutch, $t$, with the worm, T, or the clutch, $t'$ with the worm T', or both clutches with both worms. The clutches are, for perspicuity, shown herein as manually operative, but any common automatic device may be used to engage the clutches and worms. After the clutch connections have been completed, the hand wheel, $s^2$, is rotated in either direction sufficiently to give the segment bar or bars the elevation requisite for the shift required.

What I claim is,

1. In a tentering machine the combination with the chain wheels and chains, of eccentric means on the driving shaft of said wheels actuating the chain wheels for imparting any desired alternating speed of the chains relatively to each other.

2. In a tentering machine the combination with the chain wheels and chains, of eccentric means on the driving shaft of said wheels actuating the chain wheels for imparting to the chains simultaneously a positive movement in the same direction with variable speed as they advance.

3. In a tentering machine, the combination with the wheels and chains of a divided driving shaft, and devices on the shaft adjustable with respect thereto for imparting to one of the chains a constant, and to the other chain an intermittent motion.

4. In a tentering machine the combination with stationary side rails, of chain wheels above the side rails, chains on the wheels, and eccentric means independent of the side rails and actuating the chain wheels for varying the speed of the chains.

5. In a tentering machine the combination with a stationary side rail, chain wheels above the side rail, chains on the wheels, a divided driving shaft, and operative connections between the driving shaft and chain wheels, of mechanism eccentric to and upon the driving shaft for imparting irregular rotation to the shaft.

6. In a tentering machine the combination with the chain wheels and chain, of a fixed side rail, a divided driving shaft transversely arranged to said chains, power transmitting connections between said driving shaft and chain, a driving wheel upon the driving shaft, eccentric means on the driving shaft for actuating the chain wheels to impart to the chains any desired alternating speed relatively to each other and suitable means for rotating the driving wheel.

7. In a tentering machine the combination with the driving shaft, a chain wheel, a chain upon the wheel, a driving wheel upon the driving shaft, and suitable eccentric means for imparting to the driving wheel a rotary motion of variable velocity.

8. In a tentering machine, the combination with the stationary side rails, the chain wheels and the chains, of means for actuating said chains to give varying motions thereto, the same comprising a driving shaft, an adjustable arm provided with a segmental slot through which the driving shaft passes, a bearing upon the face of the arm around the slot, a gear loosely mounted upon the bearing, a driving wheel upon the shaft adjacent the gear, a pin connecting the driving wheel and gear, and means for driving the gear.

9. In a tentering machine the combination with the chain wheels, chain, driving shaft, and power transmitting connections between the driving shaft and chain, of an adjustable arm provided with a slot through which the driving shaft passes, a bearing upon the face of the arm around the slot, a gear rotatably mounted upon the bearing, a driving wheel upon the shaft, means for engaging the gear and driving wheel, and means for driving the gear.

10. In a tentering machine, the combination with the stationary side rails, the chain wheels and the chains, of means for actuating said chains to give varying motions thereto, the same comprising a power shaft, a pinion fixed thereon, a driving shaft, an arm loosely pivoted on the power shaft provided with a segmental slot and a bearing upon its face around the slot, a gear loose upon the bearing and meshing with the pinion, a wheel fixed to the driving shaft, and a pin connecting the gear and wheel.

11. In a tentering machine, the combination with the stationary side rails, the chain wheels and the chains, of means for actuating said chains to give varying motions thereto, the same comprising a driving shaft, an adjustable arm provided with an oblong slot through which the driving shaft passes, a bearing upon the arm around the slot, a gear loosely mounted upon the bearing and provided with a radial slot, a driving wheel upon the shaft adjacent the gear provided with a radial slot, a pin adjustably mounted in the slot of the gear and registering in the slot of the wheel, and means for driving the gear.

12. In a tentering machine, the combination with the stationary side rails, the chain wheels and the chains, of means for actuating said chains to give varying motions thereto, the same comprising a power shaft, a pinion fixed thereon, a driving shaft, an adjustable arm loosely pivoted on the power shaft, provided with a vertically disposed segmental slot and a bearing around the slot, a gear loose upon the bearing, and meshing with the pinion, a wheel fixed to the driving shaft, a pin connecting the gear and wheel, and means for vertically adjusting the arm in relation to the driving shaft.

13. In a tentering machine the combination with the chain wheels and chain, of a driving shaft, power transmitting connections between said driving shaft and chain, a power shaft, a pinion fixed on the power shaft, an adjustable arm loosely pivoted on the power shaft provided with an oblong slot and a bearing around the slot, a gear loosely mounted upon the bearing and meshing with the pinion, a wheel fixed to the driving shaft, a pin connecting the gear and wheel, and means for adjusting the arm in relation to the driving shaft.

14. In a tentering machine the combination with two sets of chain wheels and chains, of a divided driving shaft, power transmitting connections between each section of the driving shaft and the respective chains, eccentric devices upon each shaft section for imparting an independent variable rotary motion to each shaft, and means for regulating the relative degree of variance in the rotation of the sections.

15. In a tentering machine the combination with two sets of chain wheels and chains, of a divided driving shaft for actuating each set of chains, eccentric devices upon each shaft section for imparting an independent variable rotary motion to each shaft, and means for regulating the relative degree of variance in the rotation of the sections.

16. In a tentering machine, the combination with the stationary side rails, the chain wheels and the chains, of means for actuating said chains to give varying motions thereto, the same comprising a power shaft, a pinion fixed thereon, a driving shaft, an arm loosely pivoted to the power shaft provided with a vertically disposed oblong slot and a bearing around the slot, interspaced lugs also upon the arm, a gear loosely mounted upon the bearing and meshing with the pinion, a wheel fixed to the driving shaft, a pin connecting the gear and wheel, a vertical threaded rod rotatably mounted adjacent the said arm, a threaded block loosely mounted upon the rod and engaging the lugs, a worm wheel fixed to the rod, a worm engaging the worm wheel, a shaft upon which the worm is mounted, and means for rotating the worm shaft.

17. In a tentering machine, the combination with the stationary side rails, the chain wheels and the chains, of means for actuating said chains to give varying motions thereto, the same comprising a power shaft, a pinion fixed thereon, a driving shaft, an arm loosely pivoted to the power shaft provided with a vertically disposed oblong slot and a bearing, interspaced lugs also upon the arm, a gear upon the bearing and meshing with the pinion, a pin connecting the gear and wheel, a vertical threaded rod rotatably mounted adjacent the arm, a threaded block mounted upon the rod and engaging the lugs, a worm wheel fixed to the rod, a worm engaging the worm wheel, a transverse shaft in alinement with the worm, a clutch upon the transverse shaft adapted to engage the worm, and means for rotating said transverse shaft.

In testimony whereof I have affixed my signature in presence of two witnesses.

WILLIAM A. CHURCH.

Witnesses:
HORATIO E. BELLOWS,
NELLIE S. REED.